United States Patent [19]

Peschke et al.

[11] 3,800,285

[45] Mar. 26, 1974

[54] SELECTING AND STORAGE CIRCUIT FOR JUKE BOX

[75] Inventors: Walter C. Peschke, Saratoga; William R. Novak, Milpitas, both of Calif.

[73] Assignee: NSM Apparatebau GmbH Kommanditgesellschaft, Bingen/Rhein, Germany

[22] Filed: Dec. 8, 1972

[21] Appl. No.: 313,517

[52] U.S. Cl. .......................... 340/162 R, 340/147 R

[51] Int. Cl. .......................... H04q 3/00

[58] Field of Search .......................... 340/162 R

[56] References Cited

UNITED STATES PATENTS 3,662,344 5/1972 Mienke .......................... 340/162 R

*Primary Examiner*—Harold I. Pitts
*Attorney, Agent, or Firm*—W. G. Fasse

[57] ABSTRACT

A system for controlling the operation of a juke box includes selection keys for producing a coded signal corresponding to a record to be played and a shift register for temporarily storing these signals. These signals are compared with the counting state of a clock pulse operated counter to produce a bit signal by coincidence, and this bit signal is entered into a given stage of a continuously circulating shift register also operated by the clock pulse. A second counter is stepped in response to the position of the juke box carrier, and the counts of the two counters are compared to produce a bit pulse for interrogating the given stage of the circulating shift register. If a bit is present at the given stage of the circulating shift register when the counts of the two counters are equal, a signal is produced for stopping the record carriage to effect the playing of the record.

17 Claims, 4 Drawing Figures

SELECTING AND STORAGE CIRCUIT FOR JUKE BOX

BACKGROUND OF THE INVENTION

The present invention relates to a selecting and storage circuit arrangement for selectively locating one or more bits of information from a plurality of bits of information. Each of these bits of information is stored in a respective storage location especially for the selection and storage of each side of records to be played in a jukebox.

Although the present invention is suitable for use in different systems for the retrieval of information, it will be described in the following specification, specifically in connection with its use in a coin operated juke box, such arrangements generally comprise a magazine containing a plurality of individually playable records as well as a carriage for lifting a record out of the magazine, depositing the record on a turn table, playing the record and returning the record into the magazine. The use of record selecting devices which make it possible for the player or operator to select certain record sides is known and the provision of a storage device in which the selected side of a record is stored is also known.

Heretofore, juke boxes have generally comprised selecting and storage systems which are basically of the mechanical or electromechanical type, for example electromagnetic relays. These systems require a rather expensive maintanence due to their wear and tear and their contact characteristics.

Further, there are systems known in the art which employ magnetic core memories. These memories, however, make the manufacture of the systems rather expensive. Control systems are also known for use in combination with juke boxes, which are essentially comprised of electronic elements such as diodes, transistors and integrated circuits in order to make possible a faster operation as well as a more economical manufacture. The systems, however, are subject to a relatively large number of troubles and they employ a large number of electronic elements so that here again the same disadvantages are encountered as in connection with the use of magnetic core memories. A system has been suggested heretofore employing a shift register in combination with an auxiliary register to form a memory. Such a system, however, has the distinct disadvantage that the informations which are being stored during a read-out time of a row cannot be retrieved or taken into account during such read-out time.

OBJECTS OF THE INVENTION

In view of the above it is the aim of the invention to achieve the following objects singly or in combination:

to provide an improved selecting and storage or memory circuit for the selective locating of one or several bits of information from a plurality of bits of information, for example, the position of the records to be played in a juke box; and to provide a system in which a fast operating memory system is to be interrogated in each position of a slowly advancing interrogating system for information in such position.

SUMMARY OF THE INVENTION

Briefly stated, in accordance with the invention, the above objects are achieved by providing a 10 key keyboard which is connected through a matrix with a code converter, the outputs of which are connected to an addressing control logic circuit and to an intermediate memory. The intermediate memory in turn is connected to a first comparator which cooperates with a first counter operating with the clock pulse. The output of the first comparator is connected to a dynamic shift register operating with the clock pulse. The first counter and the shift register are both connected to a source of synchronizing pulses. The output of the first comparator is connected to a sequence logic circuit which in turn is connected to a second counter. The second counter is connected together with the first counter and with the shift register to a second comparator. Such a circuit may be manufactured more economically as compared to the circuits known heretofore and at the same time the present circuit is less subject to faults and defects.

The invention provides the advantage that it is readily adaptable to the use of LSI MOS devices in order to implement the control and memory. Thus, in a preferred embodiment of the invention, an LSI MOS chip encorporates a recirculating dynamic shift register, which is employed as a memory. A BCD counter toggles at the same frequency as the shift register advances, the counter thereby forming an address counter. When an operator depresses a key on a selection keyboard on the apparatus, a BCD number is set in parallel into a keyboard register. The BCD number thus set corresponds to the keyboard markings and a given record side. When the number set in the keyboard register is identical to the contents of the address counter, a "1" is inserted into the memory. The system is arranged so that when at least one record is selected, this causes the output of the LSI MOS chip to effect a "searching" mode in the carrier of the juke box. As the carrier increments from one record position to the next, it sends pulses to the LSI MOS chip. These pulses are counted in a "head" counter. Thus, the contents of the head counter correspond to the record carrier location. When the content of the head counter is identical with the contents of the address counter, the memory is interrogated to determine if the record has been chosen. If it has been chosen, the memory content is erased and the LSI MOS chip output controls the juke box to play the record. Reading and writing can occur in the system simultaneously, that is, the keyboard can be operated to select a record at the same time that the juke box is searching for a selected record.

BRIEF FIGURE DESCRIPTION

In order that the invention may be clearly understood, a circuit arrangement according to the invention will now be described by way of example, with reference to the accompanying drawings of which:

DETAILED DESCRIPTION OF EXAMPLE EMBODIMENTS

Figure 1:
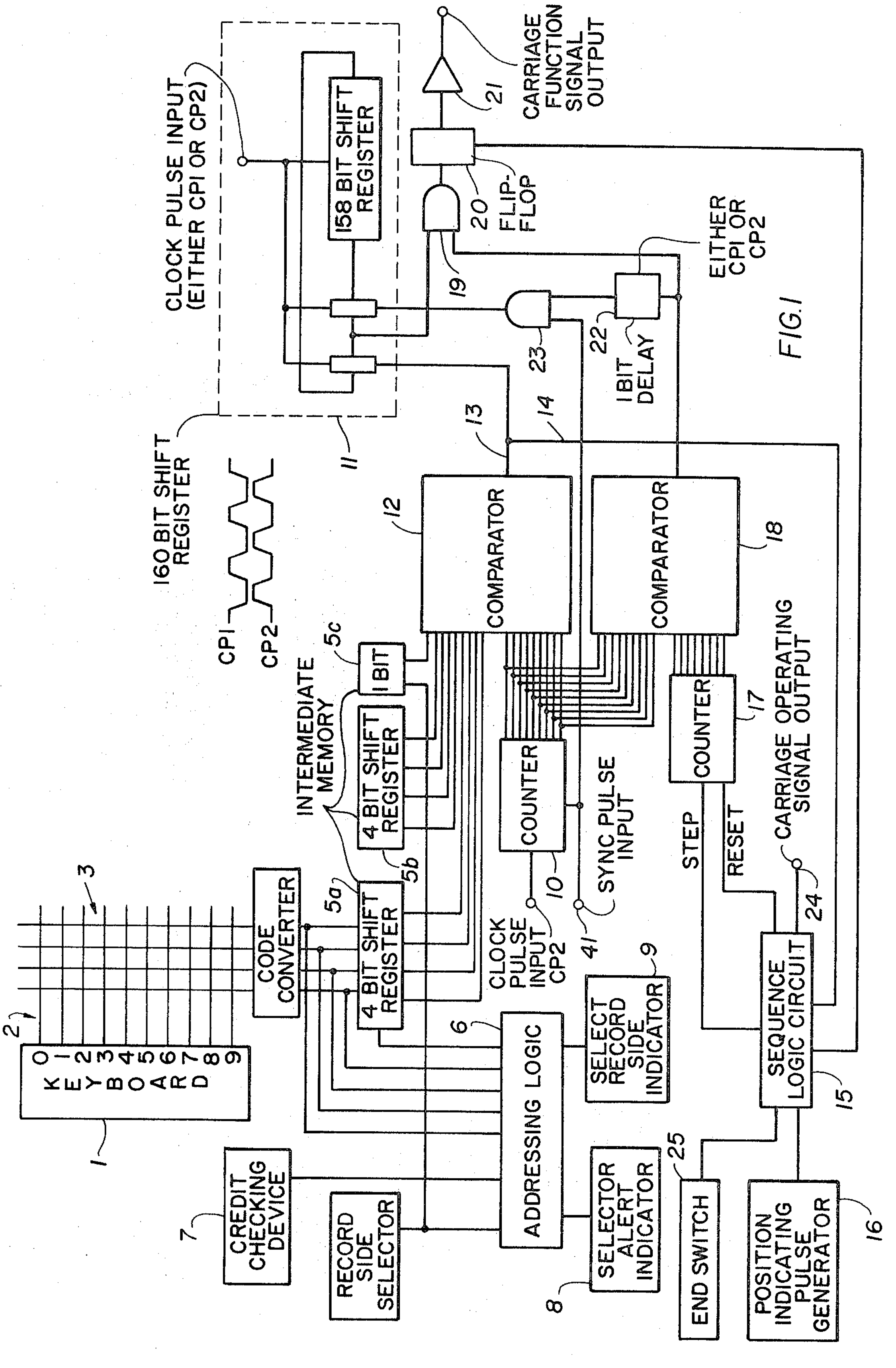
FIG. 1 is a simplified block circuit diagram of a circuit arrangement in accordance with the invention.

In the preferred embodiment of the invention, as illustrated in the drawings, a system is provided for receiving and storing information, and for retrieving the information especially for the purpose of programming a juke box. It will be understood, of course, that the system may also be adaptable to other applications within the scope of the invention, and hence the following description of the preferred embodiment of the invention is illustrative only.

In order to simplify the understanding of the invention prior to its detailed description, in the preferred embodiment of the invention a juke box is provided which has ten numbered selection keys and two lettered keys. Each recording which may be played is given a code number, e.g. from 00 to 99, and the sides of each record are designated A or B. When an operator decides upon the selection he desires to have played and after depositing any coins that may be required, he first pushes the first number of the numerical code of the record. Then upon seeing an indicating light on the device he pushes the second number of the numerical code in the numbered selection keys. Finally, after seeing a further indicating light, he pushes the A or B button to select the desired side of the record. The selection may be made at any time during the sequence of operation of the device, and as will be more fully explained in the following paragraphs, the device has the capacity for storing a large number of selections to be played.

Figures 2, 4:
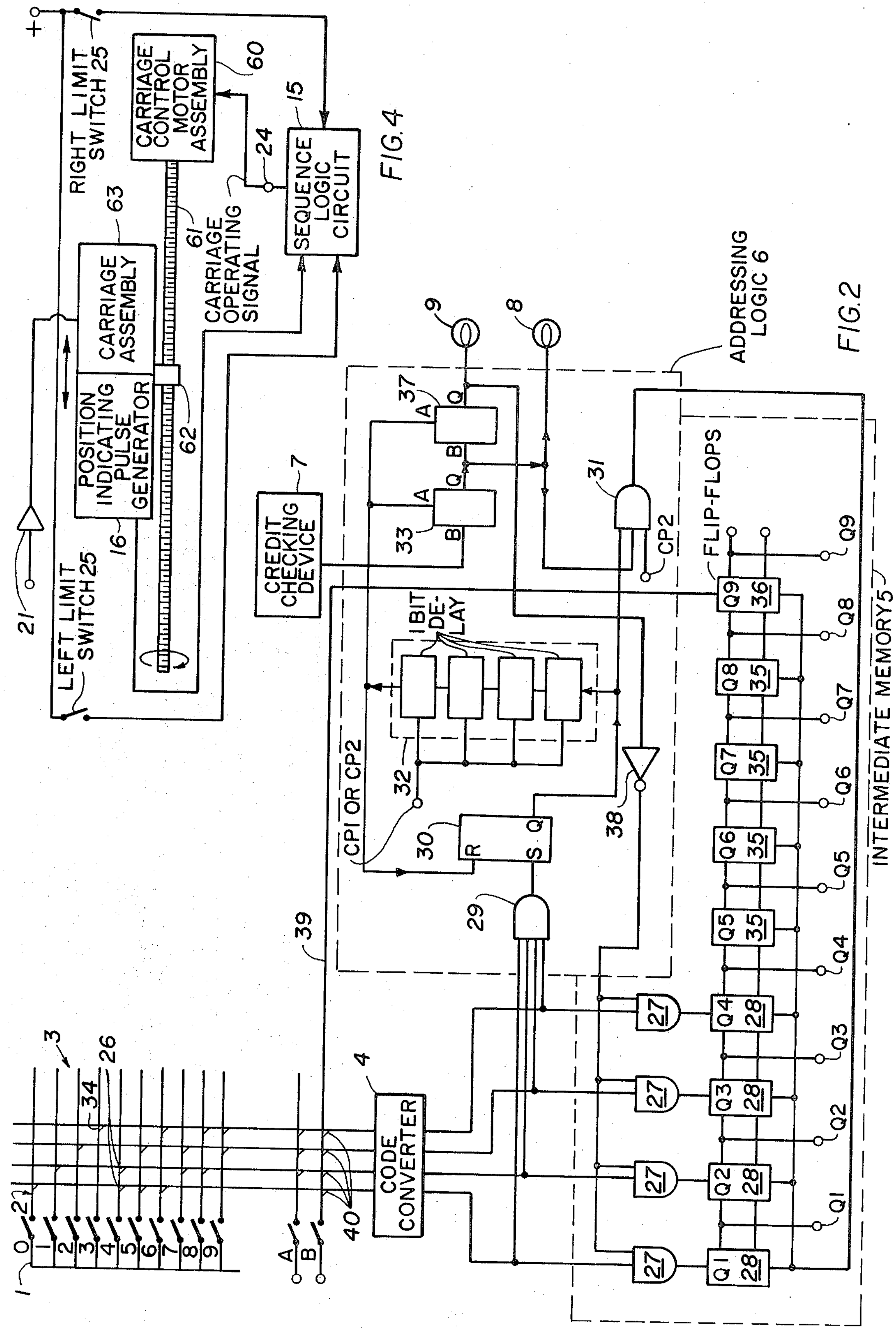
FIG. 2 illustrates in further detail a block diagram of certain circuit blocks shown in FIG. 1.
FIG. 4 is a simplified illustration of elements of a juke box that may be employed in combination with the system of FIG. 1.

Referring now to FIGS. 1 and 2 the keyboard 1 comprises 10 keys numbered 0 and 1 to 9. Each key is adapted to close a respective contact as shown in FIG. 2. The contacts are connected to conductors 2 forming part of a matrix 3, which operates as an encoding device to produce a so called 4-bit signal. Sources of potential which are obvious have been omitted for the sake of clarity of the drawing. The encoding which takes place in the matrix 3 may be of any known type. The matrix 3 is connected through respective conductors to a code converter 4 which converts the signal received from the matrix 3 into a BCD signal (binary coded decimal signal). The 4-bit outputs of the code converter 4 are connected separately to the first 4-bit inputs of a 9-bit intermediate memory. The intermediate memory is comprised of a 4-bit shift register 5*a* connected to receive the output of the code converter 4, a second 4-bit shift register 5*b* connected to receive data shifted from the register 5*a*, and a single bit register connected to receive data from the side selector control. The same outputs of the code converter 4 are also connected to addressing logic circuit means 6. Another input of the logic circuit means 6 is connected to a credit checking device 7 which ascertains whether the required coin has been inserted into the juke box. The credit checking device may be of conventional design. If the credit checking device 7 provides the proper output such as a 1 the addressing logic circuit 6 will produce an output signal which in turn is displayed for example as a "Selector Alert" signal in an indicator 8 which may, for example, be a light bar. The second selecting step which now follows in the ten key keyboard 1 results in a second output signal from the code converter 4 and this output signal represents a 4-bit output combination which is applied to the 9-bit intermediate memory 5*a* to 5*c* after the first signal in the intermediate memory 5 has been shifted by 4-bits to the register 5*b* with the aid of the addressing logic circuit means 6. Thereafter, the "Select Record Side" indicator 9 will light up due to the operation of the addressing logic 6 whereby the indicator 9 will inform the operator that he may select the desired side of a record. Upon actuating one of the keys A or B a further bit is inserted into the last register 5*c* of the 9-bit intermediate memory.

The system of FIG. 1 is provided with a suitable clock pulse source (not shown) of conventional design, which produces a clock pulse sequence CP1, and if desired, a clock pulse sequence CP2 shifted in phase by 180° with respect to the sequence CP1 as shown by the wave form in FIG. 1. The provision of two clock pulse series of the same PRF is, however, for simplification of the actual circuit design of the device, and thus for the purposes of the present invention it may be considered that a single source of clock pulses is provided. It is noted on the drawing at certain of the terminals, that either of the series may be employed. In addition, the system also includes a source of synchronization pulses (not shown). This source is operative only upon the initial energization of the device, i.e. when it is first turned on, to provide for the initial synchronization of the counter 10 and the 160-bit shift register 11. The source of synchronization pulses may thus be a conventional pulse generator that provides a single pulse when the equipment is turned on, the single pulse being synchronized with a clock pulse, and serving to initially reset the counter 10 and register 11 to predetermined settings.

The shift register 11 and the counter 10 both operate dynamically and are controlled by the clock pulse CP1 or by the clock pulse CP2 respectively so that a continuous ring around operation of these devices is accomplished. Whenever during its continuous operation the counter 10 reaches a count which corresponds to the output of the 9-bit intermediate memory 5, the comparator 12 produces an output signal on line 13 which sets the bit of the shift register 11 corresponding to the instantaneous count of the counter 10 to be equal to 1. Simultaneously a signal is supplied through the conductor 13 and the conductor 14 to the sequence logic circuit means 15. As a result, the carriage of the juke box which, for example, may be in its starting position is now started by an operating signal appearing at the output 24 of the sequence logic circuit means 15. The record magazine of the juke box comprises a position signifying member for each record, for example, in the form of a mechanical contact. When the carriage passes the magazine the mechanical contact is actuated to produce a position indicating pulse which is supplied to the sequence logic circuit means 15. The arrangement for producing the position indicating pulses is indicated in FIG. 1 by the positive indicating pulse generator 16. This position indicating pulse effects the further operation of the counter 17 in such a manner that it advances the counter 17 one position in response to each received position signifying pulse.

The counters 10 and 17 operate in accordance with the same code, however, with different speeds. Whereas the counter 10 operates with the speed corresponding to the clock pulse CP2, the counter 17 operates with a speed which depends upon the mechanical operational speed of the carriage and the counter 17 may thus operate intermittently as, for example, when the carriage stops during the playing of a record. The advancing of the counter 17 is sufficiently slow so that it will remain in each position for a period of time which the counter 10 has completed at least one full counting cycle. When the comparator 18 ascertains equality between the counters 10 and 17, the comparator produces a 1 signal at its output and the signal is supplied as one input to an AND-gate 19. The output of a predetermined stage of the shift register 11 is supplied as the second input of the gate 19. If the shift register 11 simultaneously produces a 1 signal, that is during the selecting or storing process a 1 has been inserted into this position of the register 11, then the AND-gate 19 will open, that is, it will pass a signal for setting the flip-flop 20. This flip-flop or bistable multivibrator 20 provides an output signal at this time which is supplied to the amplifier 21 which changes the function of the carriage; namely, the function "run" is changed to the function "play". In other words when a signal appears at the output of the amplifier 21, the signal effects the control of the carriage to stop moving with respect to the magazine, and to play the record and side corresponding to the bit at the predetermined stage of the shift register 11 at that time. Conventional control systems may be employed for this purpose.

The output signal of the comparator 18 which is supplied to the AND-gate 19 is also supplied to a 1-bit delay member 22 which may comprise a flip-flop set by the output of the AND-gate and reset by the next clock pulse. The output of the delay member 22 is applied as one input to an OR-gate 23. The output of this gate resets the bit in the shift register 11 to zero which previously during the selecting process has been set to 1. That is, the bit in the shift register 11 which had been set to 1 corresponded to a given record and side and the setting of this bit was a result of the coincidence of the inputs of the comparator 12 from the 9-bit register 5 and the counter 10. This bit of course circulates continuously in the shift register 11 until a coincidence occurs between the inputs of the comparator 18 at the time the set bit appears in the predetermined stage of the shift register, and at this time as above described the carriage is signaled to play the record. A delay is required in the resetting of the shift register to erase the bit, however, in order that the "play" signal be produced before the bit is erased. As shown in the figure, the synchronization signal is applied as the second input to the OR-gate 23. It is thus apparent that, in order for complete synchronization of the device to occur upon the turning on of the device, the synchronization signal must have a pulse length equal to at least one full counting cycle. Alternatively, of course, each stage of the register may be reset by a shorter synchronization pulse.

After the record has been played the carriage will return the record into the magazine. If the carriage at this time is not in its end position, that is, the stop or end switch 25 is not closed, the sequence logic circuit means 15 will supply a control signal to the carriage through the output 24 to set the carriage in motion. If at this time a further bit is present in the shift register 11 as a result of insertion therein by means of the ten key keyboard 1 via the code converter 4 the intermediate memory 5, the comparator 12 (which assures the comparison with the counter 10) and through the conductors 13, then the carriage will recognize this next set bit in the manner described above in response to which the carriage will stop at the position corresponding to this bit. The change between playing and advancing is repeated in accordance with the number of bits set into the shift register 11. If no further record is played in the direction of motion of the carriage, then the counter 17 is returned to the zero position by the sequence logic circuit means 15 in response to the operation of one of the stop switches 25, i.e. at the end of travel of the carriage. The change between playing and advancing is repeated in accordance with the number of the inserted bits. The counter 17 is reset to zero by the sequence logic circuit means 15 in response to one of the end or stop switches 25 if no further record is played in the direction of advance of the carriage. The end switch 25 simultaneously causes a reversal of the direction of motion of the carriage by any suitable conventional technique either in the circuit of FIG. 1 or the carriage. Also in this direction of motion, the interrogation of the shift register 11 is repeated so that again a change between the function of advancing and the function of playing of the carriage is accomplished if bits have been inserted. If no further bits have been inserted in the register 11, the carriage returns to its zero starting position and stops.

The individual circuit blocks of the circuit arrangement shown in FIG. 2 are all considered to be in their starting position, that is, in the zero position. In order to select a record it is necessary to sequentially enter two digits into the circuit arrangement by means of the ten key keyboard 1 and to select the respective side A or B of the record by means of the corresponding key A or B, as above described.

Referring specifically to FIG. 2, if for example the key representing the digit 4 is actuated first in the keyboard 1, a signal is supplied to the code converter 4 through the conductors 2 and the respective connection points 26 of the matrix 3. Such signal which corresponds to the digit 4 is then converted into a corresponding BCD signal which is entered or recorded in the first four flip-flop stages 28 of the 9-bit intermediate memory 5 by separate AND-gates 27. Simultaneously, the bistable multivibrator 30 of the addressing logic circuit means 6 is set by the signal appearing at the outputs of the converter 4 connected through the OR-gate 29 to the set input of the multivibrator 30. The output of the multivibrator 30 is connected on the one hand to one input of an AND-gate 31 and on the other hand to a 4-bit delay stage 32 which is clocked by means of the clock pulse CP1 or CP2. The delayed output signal of the delay stage 32 is supplied to the reset input of the bistable multivibrator 30 and also to the set input of the bistable flip-flop 33. The flip-flop 33 and the flip-flop 37 which are initially in the zero state, i.e. have zero outputs at the terminals Q, can be set to the state 1 by an input pulse to the terminal A only if a signal 1 appears at the terminal B, but can be reset to zero regardless of the state of the terminal B. Thus, a 1 is set at the output of the flip-flop 33 if, by proper actuation of the credit interrogation means 7, a 1 is present at the flip-flop 33 (terminal B), whereby the indicator 8 which signifies that the second digit should be selected is actuated. Simultaneously the output of the flip-flop 33 is supplied to the second input of the AND-gate 31. (The clock pulse is applied as the third input of the AND-gate 31). At this time, however, no output appears at the output of gate 31, since its first input from flip-flop 33 has returned to zero.

If in the next selection step, for example the key representing the digit 3 is actuated, the respective signal is supplied through the conductors 2 and through the interconnection point 34 to the code converter 4 which converts the signal into a BCD signal corresponding to the digit 3. The outputs of the code converter 4 are now connected to the flip-flop 30 through the OR-gate 29. The output of the flip-flop 30 opens the AND-gate 31 so that the shifting clock pulse CP2 may pass therethrough. The output of the AND-gate 31 supplies a shifting clock signal NCP2 to the flip-flops 28, 35 and 36. The BCD signal in the first four stages 29 is shifted into the second four flip-flop stages 35 by means of the shifting clock pulse signal NCP2. Thereafter the BCD signal still present in the code converter 4 is inserted into the first four flip-flops 28 through the AND-gates 27. Suitable conventional techniques may be employed to delay this insertion until the first four bits have been shifted. The output signal of the bistable multivibrator 30, which has been delayed in the 4-bit delay stage 32 now causes the resetting of the flip-flop 33 to zero and the setting of the flip-flop 37 to 1. Thus, the indicator 8 directing the selection of the second digit is deenergized and the indicator 9 directing the selection of the side of the record is energized so that, for example, a respective bulb lights up. Simultaneously, the AND-gates 27 are closed through the invertor 38 so that the next following signals may not pass.

Referring now, for example, to the situation where the side B of a record has been selected by the actuation of the key B the flip-flop 36 of the 9-bit intermediate memory 5 is set through the conductor 39. Simultaneously a signal is inserted into the code converter 4 through the interconnecting points 40 of the matrix 3, whereby the code converter 4 converts the signal into a BCD signal which does not correspond to the BCD signals 1 to 9 of the 10 key keyboard. This transformed signal sets the flip-flop 30 through the OR-gate 29. The output of the flip-flop 30 sets the flip-flop 37 to zero through the 4-bit delay stage 32 whereby the indicators 8 and 9 are extinguished. (Flip-flop 33 is not set to 1 by the last output of the flip-flop 30, since the output of the device 7, which may have been in the form of a pulse, is no longer present. The provision of such a system for the device 7 may be by any conventional means, such as a flip-flop which is set by insertion of the proper coins, and reset, for example, by the output of the flip-flop 33.) Simultaneously the flip-flop 30 is reset by means of the delayed signal from the output of the 4-bit delay stage 32. The outputs Q1 to Q9 of the 9-bit intermediate memory 5 are connected to the comparator 12 as best seen in FIG. 3.

As above described, after the present circuit arrangement has been switched on the counter 10 and the shift register 11 are synchronized with each other by means of synchronizing pulses supplied to the conductor 41 by a clock pulse generator (not shown). The shift register 11 rings around continuously in accordance with the clock pulse CP1 or CP2. The counter 10 comprising the flip-flops 42 as shown in FIG. 3 rings around continuously without interruption with the clock pulse CP2 thereby advancing from its lowest to its highest stage. The outputs QA to QI of the counter 10 are connected to the comparator 12 which comprises exclusive OR-gates 43 and the respective NOR-gate 44. The inputs of the exclusive OR-gates 43 of the comparator 12 are also connected to the outputs Q1 to Q9 of the 9-bit intermediate memory 5. The outputs QA to QI of the counter 10 are also connected to the inputs Q1 to Q9 of the comparator 18. If the comparison Q1, QA; Q2, QB; to Q9, QI results in equality in the comparator 12, then a zero is present at all outputs of the exclusive OR-gates 43, and consequently a 1 is present at the output of the comparator 12 on the line 13. Thereafter, the respective flip-flop 45 of the shift register 11 is set in accordance with the count of the counter 10. Simultaneously, the flip-flop 47 is set by means of the output appearing at the NOR-gate 44 and connected thereby by way of the conductors 13 and 14 and the OR-gate 46, whereby the amplifier 48 controls the carriage (not shown) via its output 24. Accordingly, the carriage begins to move out of its zero position.

Each time when the carriage passes a record position in the magazine a mechanical contact, i.e. the position generator 16, is closed whereby a position signifying pulse is produced which advances the counter 17 respectively by one position. The counter 17 comprises the flip-flops 50 and is connected to an invertor 58 for the resetting of the flip-flops. The position signifying pulses are supplied to the counter 17 through the AND-gate 49. The counter 17 steps slowly as compared to the counter 10 so that its outputs Q1′ to Q8′ maintain their signal for at least the duration of one full cycle of the counter 10. These outputs Q1′ to Q8′ of the counter 17 are connected to the comparator 18. The output *r*/1 of the flip-flop 51 which has been set by the end switch 55 is also connected to the comparator 18. Simultaneously the outputs QA to QI of the counter 10 are also connected to the comparator 18 which comprises exclusive OR-gates 52 for comparing the signals Q1 to QA and *r*/1 to QI. The outputs of the exclusive OR-gates 52 are connected to the NOR-gate 53. If all outputs of the exclusive OR-gates 52 signify a zero the output of the NOR-gate 53 will signify a 1. This 1 is thus simultaneously available at the input of the delay member 22 and at the AND-gate 19. The output of the NOR-gate 53 of the comparator 18 is connected through the delay member 22 to the OR-gate 23 for resetting the bit which has been recognized as the bit signifying the record to be played which bit was previously present in the flip-flop 45 and is now present in the flip-flop 56. If simultaneously the conductor 55 signifies a 1 received from the shift register 11, the AND-gate 19 is opened and the bistable multivibrator 20 is set. The output of the bistable multivibrator 20 sets the signal "play for the carriage" via the amplifier 21. Simultaneously with the setting of the bistable multivibrator 20 the bistable multivibrator 47 is reset through the OR-gate 54, and the output 24 of the device 47, which controls advancing of the carriage through the amplifier 48 is also switched off, so that the carriage is stopped. Upon the completion of the playing process of the record, the record is returned to the magazine by conventional means (not shown) and, since the carriage is not in its end position at this time, the carriage will continue to move in the direction previously given. The continued movement of the carriage is effected, if the carriage is not in an end position, since the output of the NOR-gate 57, which is 1 except in the end positions, effects the setting of the flip-flop 47 again by way of the OR-gate 46. The output of the comparator 12 is thus employed to effect the starting of movement of the carriage only when it has been stopped in the zero (left side) position due to the absence of any stored bits in the shift register 11. If a further bit remains set in the shift register 11 the just described recognition and the playing process is repeated, whereby that side of the record is played which corresponds to said bit.

Figure 3:
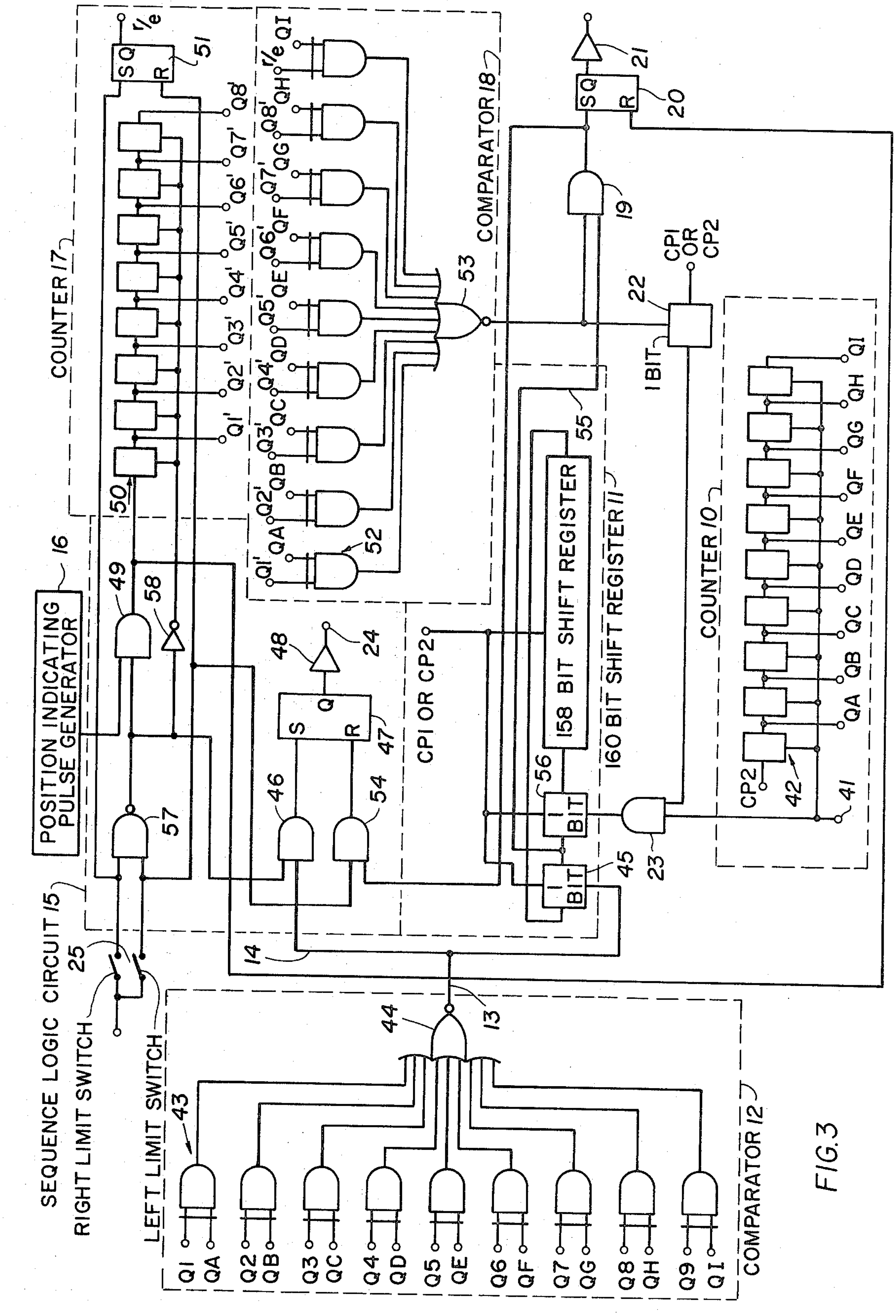
FIG. 3 shows the details of other circuit blocks of FIG. 1 whereby the respective reference numerals are employed in all three figures for the same blocks.

Referring still to FIG. 3, it is to be noted that the switch 25 is comprised of a left hand switch and a right hand switch. These switches are at opposite ends of the travel of the carriage, and are connected by way of NOR-gate 57 as one input of the AND-gate 49 so that the counter 17 only counts in positions off of the end limits. The output of the NOR-gate 57 is also connected by way of the invertor 58, to reset the counter 17 each time an end limit in either direction has been reached. In addition, as noted above, the output of the NOR-gate 57 is also applied to the multivibrator 47 by way of the OR-gate 46 so that the carriage will continue to move in a direction from the last contacted end switch to the other end switch, unless a "play" instruction has been given, and the carriage will move in the same direction after playing a record that it was moving prior to such playing of the record. The left hand limit switch 25 which corresponds to the zero position, is also connected by way of the OR-gate 54 to effect the stopping of the carriage. In addition, the limit switches are connected to the input terminals of the flip-flop 51 so that the output $r/1$ of the circuit is zero when the carriage moves in one direction, and is 1 when the carriage moves in the opposite direction. This bit corresponds to the side of the record to be played, with the A sides being played in one direction of travel of the carriage, and the B sides being played in the other direction of travel. In the arrangement of FIG. 3, it is apparent that the same count of the eight stages of the counter 17 does not correspond to the same record positions in the two directions of travel of the carriage, however, such correspondence is not necessary in the coding of the records. Alternatively of course a different conventional form of counter, or other conventional techniques, may be employed to obtain this correspondence if desired.

The output of the AND-gate 49 as shown in FIG. 3 is also employed to reset the flip-flop 20 upon passing the first record after the "play" function, so that this record will not be played unless a corresponding bit has been stored in the shift register 11.

In the above described system of FIG. 3 it is apparent that if a bit is stored in the register 11 after the corresponding position has been passed, the carriage may move to its zero position without playing the record, since the only coincidence initiated instructions to move the carriage are derived from the comparator 12, and once the carriage has reached its zero position it would remain in this position. It is obvious of course that any conventional means may be employed to effect the continued movement of the carriage as long as any stored bit remains in the storage 11. For example, only any output position from the register 11 may be employed to set the flip-flop 47 by way of an additional input of the OR-gate 46, and this signal may be made dependent if desired, for example by means of an AND-gate upon the closed position of the left limit switch 25.

In a modification of the invention, the counter 17 may be replaced by a position signifying means and the 10 key keyboard 1 may be replaced by a keyboard with units and 10 digit positions.

FIG. 4 illustrates in simplified form an arrangement which may be employed in combination with the system of FIGS. 1 to 3. This drawing is exemplary only, in order to facilitate the understanding of the system above described, and is not intended to represent any limitation on the teaching of this disclosure. FIG. 4 shows a carriage control motor assembly 60 connected to be controlled by the output of the sequence logic circuit 15. The motor assembly 60 moves the carriage back and forth under the control of the circuit 15. The assembly 60 may also include means which are responsive to the operation of the limit switches 25 for reversing the direction of movement of the carriage. In the illustration, the assembly 60 drives a carriage drive screw 61, so that a carriage assembly including a nut 62 engaging the screw 61 is driven back and forth under control of the assembly 60. The limit switches 25 are provided at opposite ends of the travel of the assembly 63, to be engaged thereby for operation. The carriage function signal from the amplifier 21 is applied to the carriage assembly 63 to control the playing of a record. The movement of the carriage is stopped in this case by signals from the sequence logic circuit 15 which are applied to the motor assembly 60. The carriage assembly 63 also carries the position indicating pulse generator 16, which generates a pulse each time a record position is passed in the course of movement of the carriage assembly, for example by means of suitable mechanical contacts (not shown) arranged along the travel path of the carriage.

Although the invention has been described with reference to specific example embodiments, it is to be understood, that it is intended to cover all modifications and equivalents within the scope of the appended claims.

What is claimed is:

1. A system for indicating the selection of a determined event from a series of sequentially occurring events, comprising a register, means for inserting a coded signal in said register corresponding to a selected event, a source of clock pulses, a counter connected to continuously count at the rate of the clock pulses, a first comparator means connected to produce a first signal bit in response to each equality of the count of the counter and the signal stored in the register, a circulating shift register connected to circulate stored bits at the rate of said clock pulses and being synchronized with said counter whereby a given stage of the shift register continuously corresponds to the instantaneous counting state of the counter, counting means for producing a counting signal that advances with the sequential advance of said events, whereby each advance of the counting means takes a period of time at least equal to a full cycle of counting of said counter, second comparator means connected to produce a second signal bit in response to each equality of said counting signal and the instantaneous count of said counter, means for inserting said first signal bit in said given stage of said shift register, means responsive to the simultaneous occurrence of said second signal bit and a bit stored in a predetermined stage of said shift register for producing an output signal, and means for erasing, following each occurrence of an output signal, the bit stored in the shift register which bit, in coincidence with a second signal bit, produces an output signal.

2. A system for storing and retrieving information bits comprising an input register, means for inserting a coded signal in said input register, a source of clock pulses, first counting means connected to said source for continuously counting a first comparator, means for continuously comparing the signal stored in said input register with the instantaneous counting state of said first counting means for producing a first bit signal upon the occurrence of each coincidence therebetween, a circulating shift register connected to be continuously shifted by said clock pulses, means for inserting said bit signal in a determined stage of said shift register, means for synchronizing said first counting means and shift register whereby said determined stage continuously corresponds to the instantaneous counting state of said first counting means, second counting means, means responsive to a given event for advancing said second counting means whereby said second counting means retain each count for a period at least equal to a full cycle of the first counting means, second comparator means continuously comparing the counts of said first and second counting means to produce a second bit signal upon the occurrence of each coincidence therebetween and means responsive to the simultaneous occurrence of said second bit signal and a bit stored in said determined stage of said shift register for producing an output signal.

3. The system of claim 2, further comprising delay means for erasing any bit stored in another stage of said shift register following said determined stage subsequent to the production of said output signal whereby information stored in the shift register corresponding to the bit producing the output pulse by coincidence is erased.

4. A control system for controlling the selection of records in a juke box of the type having carrier assembly means including a carrier adapted to move past record positions and being controllable to stop in response to a control signal for effecting the playing of a record, said system comprising a first register, means for inserting a first coded signal corresponding to a record to be played in said first register, a source of clock pulses, a counter connected to continuously count at the rate of the clock pulses, a first comparator connected to produce a first signal bit in response to each equality of the count of the counter and said first coded signal stored in said first register, a circulating shift register connected to circulate stored bits at the rate of said clock pulses and being synchronized with said counter whereby a given stage of said shift register continuously corresponds to the instantaneous counting state of said counter, means responsive to the position of said carrier for producing a second coded signal corresponding to the position of the carrier, whereby said second coded signal is changeable only at a rate slower than the full cycle counting rate of said counter, a second comparator connected to produce a second signal bit in response to each equality of said second coded signal and the instantaneous count of said counter, means for inserting said first signal bit in said given stage of said shift register, means responsive to the simultaneous occurrence of said second signal bit and a bit stored in said given stage of said shift register for producing said control signal, and means applying said control signal to said carrier assembly means.

5. The system of claim 4, comprising delay means connected to said shift register and responsive to the occurrence of said output signal for erasing the bit stored in the shift register which, in coincidence with a second signal bit, produces an output signal.

6. The system of claim 4, wherein said means for inserting a first coded signal in said first register comprises a manually actuatable keyboard and means responsive to actuation of said keyboard for producing a first N digit signal, wherein N is an integer, said first register comprising a first shift register having at least 2N stages, means for inserting said first N digit signal in the first N stage of said first shift register, means for shifting said first N digit signal to the second N stage of said first shift register, and means responsive to the receipt of said first N digit signal for indication that the signal inserting means is prepared to receive a second N digit signal from said keyboard for insertion in said first N stages, whereby said first signal comprises the signals stored in the first 2N stages of said first shift register.

7. The system of claim 6, wherein said keyboard comprises a side selecting switch, comprising means responsive to the storage of a signal in the first 2N stages of said first register for indicating that said first shift register is prepared to receive a record side code signal, and wherein said first shift register comprises an additional stage for receiving said record side code signal, whereby the signal in said additional stage also comprises part of said first coded signal.

8. The system of claim 4, wherein said means for producing a second coded signal comprises pulse generating means for producing pulses in response to the passage of said carrier by said record positions, and a second counter connected for advancing its counting position in response to an output of said pulse generating means.

9. The system of claim 8, further comprising end switch means operative upon the arrival of said carriage at its extreme positions, and means responsive to operation of said end switch means for resetting said second counter.

10. The system of claim 4, further comprising end switch means operative upon the movement of said carriage in its extreme positions, means responsive to the operation of said end switch means for stopping movement of said carriage, and means responsive to the occurrence of a first signal bit for starting movement of said carriage.

11. The system of claim 5, wherein said delay means comprises a single clock pulse delay means connected to receive said output signal and, after a delay of one clock pulse, to reset the stage of said circulating shift register next following said given stage.

12. An information selection and storage system for a juke box, comprising a code converter, a 10 key keyboard, a matrix interconnecting said keyboard and code converter, an addressing logic circuit connected to the outputs of said code converter, a clock pulse source, an intermediate memory connected to receive the output of said code converter, a first counter and a dynamic shift register connected to be advanced in synchronism by the clock pulse from said source, a first comparator connected to receive the outputs of said intermediate memory and said first counter, means connecting the output of said first comparator to said dynamic shift register, a sequence logic circuit, means for connecting the output of said first comparator to said sequence logic circuit for controlling the carrier movement of said juke box, a second counter connected to said sequence logic circuit, means for advancing said second counter with the movement of said carriage, a second comparator connected to receive the outputs of said first and second counters, and means for interrogating said shift register with the output of said second comparator.

13. The system of claim 12, wherein further comprising A and B keys corresponding to the sides of a record to be played, wherein said address logic circuit comprises means responsive to a first operation of said keyboard for indicating that a second number should be selected therein, and means responsive to a second selection therein for indicating that one of said A and B keys should be selected.

14. The system of claim 12, further comprising end switches responsive to the movement of the carrier of the juke box to its extreme position, means connecting said end switches to said sequence logic circuit for controlling the movement of said carrier, means providing pulses corresponding to the movement of the carrier past record positions in said juke box, and means applying said last mentioned pulses to said second counter for advancing said second counter.

15. The system of claim 13, wherein said addressing logic circuit comprises a bistable multivibrator connected to the set in response to the presence of an output signal in said code converter, a 4-bit delay stage connected to the output of said multivibrator, means for applying the output of said delay stage to reset said multivibrator, and means responsive to the output of said delay stage for operating said indicating means.

16. The system of claim 12, wherein each of said comparators comprise a plurality of exclusive OR-gates and an output gate connected to the outputs of said exclusive OR-gates.

17. The system of claim 12, wherein said second counter comprises position indicating means on said carriage.

* * * * *